United States Patent
Fritsch et al.

[11] Patent Number: 5,595,658
[45] Date of Patent: Jan. 21, 1997

[54] MEMBRANE BASED ON GRAFT COPOLYMERS

[75] Inventors: Detlev Fritsch, Hamburg; Klaus V. Peinemann, Geesthacht; Rolf D. Behling, Hamburg; Regine Just, Geesthacht, all of Germany

[73] Assignee: GKSS-Forschungszentrum Geesthacht GmbH, Geesthacht, Germany

[21] Appl. No.: 325,371

[22] PCT Filed: Apr. 21, 1993

[86] PCT No.: PCT/DE93/00347
§ 371 Date: Dec. 20, 1994
§ 102(e) Date: Dec. 20, 1994

[87] PCT Pub. No.: WO93/20930
PCT Pub. Date: Oct. 28, 1993

[30] Foreign Application Priority Data

Apr. 22, 1992 [DE] Germany .................. 42 13 217.7

[51] Int. Cl.$^6$ .................................................. B01D 69/02
[52] U.S. Cl. .................. 210/490; 210/500.27; 210/640
[58] Field of Search ......................... 210/490, 500.27, 210/500.42, 640; 95/44, 45, 46; 96/6

[56] References Cited

U.S. PATENT DOCUMENTS 4,245,069 1/1981 Covington .................. 525/479
5,444,106 8/1995 Zhou et al. .................. 523/107

*Primary Examiner*—Frank Spear
*Attorney, Agent, or Firm*—Robert W. Becker & Associates

[57] ABSTRACT

A membrane comprised of a graft copolymer includes a base component and a copolymer component. The base component includes a first polymer with a repeating unit:

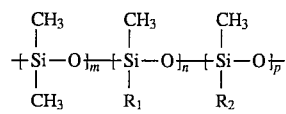

wherein m=0.1–0.9, n=0.9–0.1, p=0.03–0.04, $R_1$ can be a linear, branched or cyclic $C_1$–$C_{12}$ hydrocarbon radical, $R_2$ can be a linear, branched or cyclic $C_1$–$C_{12}$ hydrocarbon radical, and at least one of $R_1$ and $R_2$ is a linear or branched hydrocarbon radical with a terminal C=C double bond. The base component can include a second polymer with C=C double bonds located in the main chain and/or a side chain. The second polymer has a repeating unit:

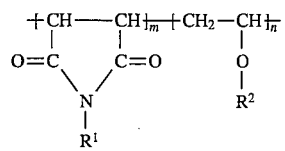

wherein m=n; $R^1$ and $R^2$ are identical or different; and 10 to 100% of $R^1$ and/or $R^2$ have a C=C double bond.

35 Claims, 1 Drawing Sheet

MEMBRANE BASED ON GRAFT COPOLYMERS

BACKGROUND OF THE INVENTION

The invention relates to a membrane, especially a gas separation and pervaporation membrane based on graft copolymers.

The inventive membrane serves to separate gas mixtures and/or gas mixtures that are comprised of gases and vapors of organic solvents, and/or for pervaporation of aqueous/organic or organic/organic mixtures.

It is known to use for the separation of gas mixtures and vapors dense films of organic plastic materials which have the function of a membrane. In general, two types of membranes are known, i.e., a) integral asymmetric membranes and b) composite membranes.

Integral-asymmetric membranes are comprised of polymers or compatible polymer mixtures that are brought into the form of a self-carrying and supporting membrane by a phase inversion process. Accordingly, it is possible to achieve a very thin, stable separating layer of the polymer or the polymer mixture.

Composite membranes are comprised of thin films that are applied onto suitable support of materials of organic or inorganic substances. The support materials must be stable with respect to their shape and must allow for incorporation into modular systems. They must provide a high gas permeability. The supports can be selected in the form of polymer, organic materials, for example, from microporous polysulfone, polypropylene, polyvinylidene fluoride, or polyetherimide supports and in the form of inorganic materials as microporous glasses or microporous aluminum oxide. Both organic and inorganic support materials can be treated for smoothing the surface with a very thin film of an especially gas permeable polymer, for example, polydimethylsiloxane or polytrimethysilypropine.

The actual separating layer is applied to the surface of the treated or untreated microporous carrier whereby for the purpose of allowing great gas flows during the gas and gas/vapor separation it is desirable to apply a film of the separating polymer that is as thin as possible, for example, 0.5 to 3 μm. With especially thin films free of micropores the gas flow through the separating layer however may be so great that the resistance of the support material has an effect on the separating efficiency of the membrane (I. Pinnau, J. G. Wijmans, I. Blume, T. Kuroda, K.-V. Peinemann, Gas Permeation through Composite Membranes, J. Membrane Sci., 37 (1988) 81 and U.S. Pat. No. 4,931,181). As a rule of thumb it can be presupposed that the effect of the support resistance on the selectivity is negative when the flow of gas through the separating layer is in the range of approximately 10% of the flow through the support. The efficiency of the entire membrane thus depends on the adjustment of the support material and the actual separating layer relative to one another. Not every support material, for example, PVDF supports, polysulfone supports, and especially hollow fiber membranes, can be manufactured so as to have the required gas flows in order to provide an optimal basis for very quick separating materials, as, for example, a PDMS membrane of 0.5 to 1 μm thickness.

For a special application in the separation of vapors under high pressure, and especially in pervaporation of organic/organic or aqueous/organic solutions it is advantageous to use thicker polymer films of approximately 3 μm up to 100 μm. An increased feed pressure is, for example, advantageous for the membrane process of a gas/vapor separation for cleaning exhaust air because this achieves, on the one hand an increased flow through the membrane can be achieved and, on the other hand, the ratio of feed pressure to permeate pressure can be adjusted in a cost efficient manner.

The separating efficiency of a given polymer will decrease more or less with an unfavorable pressure ratio.

Known polymers that are suitable for membrane separating processes are the following:

polydimethysiloxane poly(4-methyl-1-pentene)

ethylcellulose natural rubber

L D polyethylene cellulose acetate

In practice the elastomer polydimethylsiloxane (PDMS) has been proven to be the most used membrane material for the above described applications for problem solving.

The manufacture of composite membranes made of PDMS is for example disclosed in EP-A 0 254 556 and EP-A 0 181 772.

With respect to vapor separation it has been demonstrated (See K.-V. Peinemann, J. M. Mohr, R. W. Baker, The Separation of Organic Vapors from Air, AIChE Symp. Ser., 250 (1986) 19) that the technical suitability of a given membrane material is effected by two important parameters: the membrane selectivity and the ratio of feed pressure to permeate pressure. The possible pressure ratio for a membrane process is substantially determined by the separation task to be performed and must be adjusted according to economical criteria. The membrane selectivity is primarily determined by the membrane material.

In order to solve a given separation problem the required membrane surface area is greater for the same flow for a less selective membrane as compared to a more selective membrane. The flow of a membrane depends directly on its thickness. The membrane surface area thus can be reduced, when it is possible to provide thinner membranes. However, the increase of flow is limited because films thinner than 1 to 3 μm can be produced with large surface areas that are free of defects only under great difficulty. On the other hand, for very large flow rates through the composite membrane the resistance of the support material has a negative influence on the selectivity. Under these circumstances, the expected selectivity is not achieved even with a pore-free membrane. The increase of the flow rate thus does not have the desired effect.

A further issue is to be considered for the use of membrane separation processes in the recycling process of solvents from exhaust air because a given membrane with the permeability $pO_2/pN_2$ of 2, compared to a membrane of a higher separating factor for solvent vapors but same separating factor for $O_2/N_2$, enriches oxygen within the device in large amounts. A more selective membrane thus reduces possible safety risks of a membrane separating device.

It is an object of the invention to provide a membrane with a higher selectivity. Furthermore, it is an object of the invention to provide polymers which can be made into a membrane film and which adhere well and permanently to a microporous support.

SUMMARY OF THE INVENTION

The inventive membrane is comprised of a graft copolymer or graft copolymers comprising a base component and a copolymer component. The base component comprises a first polymer having a repeating unit of the following general formula:

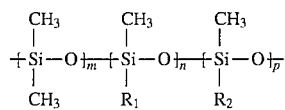

wherein m=0.1–0.9, n=0.9–0.1, p=0.03–0.04, $R_1$ can be a linear, branched or cyclic $C_1$–$C_{12}$ hydrocarbon radical, $R_2$ can be a linear, branched or cyclic $C_1$–$C_{12}$ hydrocarbon radical, and wherein at least one of said $R_1$ and $R_2$ is a linear or branched hydrocarbon radical with a terminal C=C double bond.

Preferably, the base component comprises a second polymer containing C=C double bonds that are located in the main chain and/or a side chain of the second polymer.

A preferred second polymer has a repeating unit of the following general formula:

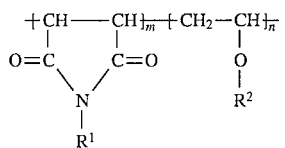

wherein m=n, wherein $R^1$ and $R^2$ are identical or different, and wherein 10 to 100% of $R^1$ and/or $R^2$ have a C=C double bond.

The C=C double bond of $R^1$ and $R^2$ is preferably a terminal C=C double bond.

The second polymer can be made from cyclic olefins by metathesis.

The first polymer and optionally the second polymer are advantageously incompletely cross-linked in solution with the copolymer component. The resulting solution is applied to a support and then cross-linked to the state of insolubility via double bonds present at the graft copolymer.

Preferably, the copolymer component comprises a siloxane copolymer of a low molecular weight having reactive sites for undergoing hydrosilylation reactions. The first and optionally the second polymers are then incompletely cross-linked in solution with the siloxane copolymer. The resulting solution is applied to a support, and cross-linked to the state of insolubility via double bonds present at the graft copolymer.

Expediently, the support is comprised of a polymer of very high gas permeability and has a thickness of 0.1 to 1.0 μm. The polymer of very high gas permeability is selected from the group consisting of polydimethylsiloxane and polytrimethylsilylpropine.

The graft copolymer is preferably a film of a thickness of 0.5 to 200 μm.

The present invention also relates to a graft copolymer comprised of a base component and a copolymer component, said base component comprising a first polymer of a repeating unit of the following general formula:

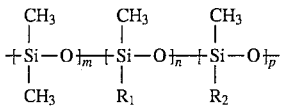

wherein m=0.1–0.9, n=0.9–0.1, p=0.03–0.04, $R_1$ can be a linear, branched or cyclic $C_1$–$C_{12}$ hydrocarbon radical, $R_2$ can be a linear, branched or cyclic $C_1$–$C_{12}$ hydrocarbon radical, and wherein at least one of said $R_1$ and $R_2$ is a linear or branched hydrocarbon radical with a terminal C=C double bond.

The base component may further comprise a second polymer containing C=C double bonds, wherein said C=C double bonds are located in the main chain of said second polymer and/or in a side chain of said second polymer. The second polymer has preferably a repeating unit of the following general formula:

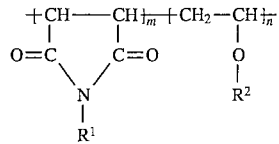

wherein m=n, wherein $R^1$ and $R^2$ are identical or different, and wherein 10 to 100% of $R^1$ and/or $R^2$ have a C=C double bond.

Preferably, the graft copolymer as defined above is dissolved in a solvent. The graft copolymer is preferably at least partially cross-linked, and in a preferred embodiment is cross-linked to a state of insolubility.

The copolymer component of the graft copolymer comprises preferably a siloxane copolymer of a low molecular weight having reactive sites for undergoing hydrosilylation reactions.

The present invention also relates to a method of manufacturing a membrane, said method comprising the steps of:

providing a base component comprising a first polymer of a repeating unit of the following general formula:

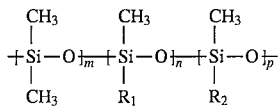

wherein m=0.1–0.9, n=0.9–0.1, p=0.03–0.04, $R_1$ can be a linear, branched or cyclic $C_1$–$C_{12}$ hydrocarbon radical, $R_2$ can be a linear, branched or cyclic $C_1$–$C_{12}$ hydrocarbon radical, and wherein at least one of said $R_1$ and $R_2$ is a linear or branched hydrocarbon radical with a terminal C=C double bond;

dissolving the first polymer in a solvent to form a polymer solution;

adding a copolymer component to the polymer solution;

adding a cross-linking catalyst to the polymer solution;

partly cross-linking the first polymer with the copolymer component to a desired degree to form a partly cross-linked graft copolymer solution;

applying the partly cross-linked graft copolymer solution to a support; and continuing cross-linking until the graft copolymer is insoluble.

The step of partly cross-linking advantageously includes the step of monitoring the degree of cross-linking by gel chromatography.

The copolymer component preferably comprises a siloxane copolymer of a low molecular weight having reactive sites for undergoing hydrosilylation reactions. The step of adding a catalyst then includes the step of adding a hydrosilylation catalyst.

The siloxane copolymer is preferably added to the polymer solution in an amount of 5 to 10 weight-%, based on the total weight of the first polymer and the siloxane copolymer.

In another embodiment of the present invention the method of manufacturing the membrane comprising the steps of:

providing a first polymer of a repeating unit of the following general formula:

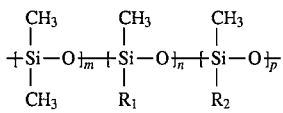

wherein m=0.1–0.9, n=0.9–0.1, p=0.03–0.04, $R_1$ can be a linear, branched or cyclic $C_1$–$C_{12}$ hydrocarbon radical, $R_2$ can be a linear, branched or cyclic $C_1$–$C_{12}$ hydrocarbon radical, and wherein at least one of said $R_1$ and $R_2$ is a linear or branched hydrocarbon radical with a terminal C=C double bond;

providing a second polymer containing C=C double bonds;

dissolving said first polymer and said second polymer in a solvent to form a polymer solution;

adding a copolymer component to the polymer solution;

adding a cross-linking catalyst to the polymer solution;

partly cross-linking the first polymer and the second polymer with the copolymer component to a desired degree to form a partly cross-linked graft copolymer solution;

applying the partly cross-linked graft copolymer solution to a support; and continuing cross-linking of the graft copolymer until the graft copolymer is insoluble.

The C=C double bonds of the second polymer are located in the main chain and/or a side chain of the second polymer.

The second polymer preferably has a repeating unit of the following general formula:

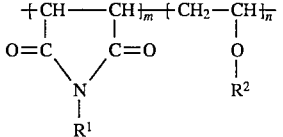

wherein m=n, wherein $R^1$ and $R^2$ are identical or different, and wherein 10 to 100% of $R^1$ and/or $R^2$ have a C=C double bond.

The step of partly cross-linking includes the step of monitoring the degree of cross-linking by gel chromatography.

The copolymer component preferably comprises a siloxane copolymer of a low molecular weight having reactive sites for undergoing hydrosilylation reactions, wherein said step of adding a catalyst includes the step of adding a hydrosilylation catalyst. The siloxane copolymer is preferably added to the polymer solution in an amount of 5 to 10 weight-% based on the total weight of the first and second polymers and the siloxane copolymer.

A component of the inventive membrane and also of the inventive grafted copolymer is a first polymer that formally can be derived from polydimethysiloxane and has the following basic structure of the general formula I.

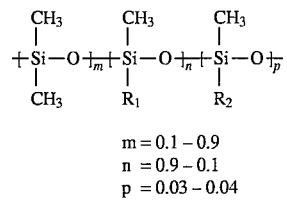

m = 0.1 – 0.9
n = 0.9 – 0.1
p = 0.03 – 0.04

The radicals $R_1$ and $R_2$, which may be identical or different, represent a linear, branched or cyclic $C_1$–$C_{12}$ hydrocarbon whereby at least one of the radicals $R_1$ and $R_2$, preferably the radical $R_2$, has a terminal C=C double bond.

The radicals $R_1$ and $R_2$ not having a double bond are, for example, alkyl radicals, such as methyl, ethyl, propyl, butyl ... octyl radicals .... When the radical $R_1$ and/or the radical $R_2$ has a double bond then it is understood that this radical must have at least two C atoms. The simplest and, at the same time, preferred radical is vinyl. However, it is also possible to use longer chain alkene radicals such as alkyl and butene radicals etc.

This first polymer, which can be called the base polymer, has preferably an average molecular weight of 10 to 300,000 g/mol and has an oily consistency. In this form the first polymer cannot be used as a membrane. By addition of 5 to 10 weight % of a second component, respectively, a copolymer and addition of a catalyst rubber-like, formed bodies can be vulcanized after intensive mixing and heat treatment. However, this technique is not suitable for manufacturing thin (0.5 to 20 µm) polymer films on a microporous support.

As a copolymer siloxane copolymers can be used which are of a low molecular weight and are able to undergo hydrosilylation reactions. These siloxane copolymers have at least one H atom bonded directly to an Si atom.

However, vulcanization can also be performed in solution and can be monitored on-line by gel chromatographic methods. This has the advantage that the vulcanization can be stopped at a defined point. Thus, well defined solutions can be obtained that can be used as a base for the coating of microporous supports that are known per se.

The base polymer can also be vulcanized with one or more other polymers that contain C=C bonds. For this purpose, the base polymer is preferably mixed in a suitable solvent with one or more of such second polymers, to which is added the second component described above and a catalyst, and is then partly cross-linked (vulcanized) in solution, i.e., to a certain point. Thus, it is possible to chemically connect polymer materials which otherwise would lead to a phase separation within a film, and apply the polymer materials in the form of a film without defects onto a microporous support.

The second polymer that contains C=C double bonds can be, for example, a polymer of repeating units of the following formula II.

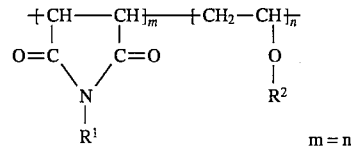

m = n

Such polymers are known from German Patent Application P 41 20 919.2-44. The disclosure of this German Patent Application is expressly incorporated herewith. The radicals $R^1$ and $R^2$, which may be identical or different, are preferably linear, branched or cyclic $C_1$–$C_{18}$ hydrocarbon radicals having one double bond within the main chain or in one side chain, whereby a terminal double bond is preferred.

As a second polymer it is also possible to use polymers that are synthesized by a metathesis reaction from cyclic olefins, preferably cyclopentene, cyclooctene, norbornene, and dicyclopentadiene, which polymers, as a result of their method of manufacturer, have a defined amount of C=C double bonds so that they can be used for the inventive graft copolymerization.

As the second polymer it is not only possible to use the aforementioned polymers but also polymers that have a C=C double bond and are able to cross-link via this double bond. The ratio of first polymer, respectively, base polymer, to the second polymer is not critical. These polymers can be used in a suitable ratio.

From the aforementioned graft copolymers with or without reactive groups, films can be produced with conventional methods on smooth surfaces of glass, hydrophobic glass, metal, or plastic materials or microporous substrates, for example, microporous flat membranes or hollow fibers comprised of polytetraflouroethylene, polypropylene, polysulfone, polyetherimide etc. These methods are advantageous for less viscous solutions, such methods being described in the American literature as meniscus coating or dip coating. With these methods preferably thin films of 0.5 to 10 μm can be manufactured. For thicker films of 10 to 200 μm the application of a concentrated polymer solution with blades or a glass rod is preferred. For smaller pieces of membrane it is also possible to evaporate a 5 to 10% polymer solution from a glass plate in the open or in a closed chamber by purging with nitrogen or argon as a protective gas.

The thickness of the resulting membranes it is generally between 0.5 and 200 μm.

The inventive graft copolymers have better gas and vapor separating properties than the known polymers of the prior art and, depending on the requirements, can be manufactured to very thin or thick films, i.e., films whose thickness can be varied. Furthermore, they are cross-linkable by suitable chemical reactions and are thus made stable with respect to their shape and insoluble. They can be applied to a microporous support and adhere to it well and permanently. The inventive membranes which can be made from the inventive graft copolymers are suitable for gas/vapor separation as well as for liquid/liquid separation (pervaporation). The graft copolymers can be applied in a reproducible and simple manner in defined layer thickness onto suitable support materials and yield membranes better than membranes known from the prior art.

The composite membrane manufactured with the aid of the inventive graft copolymers for gas/vapor separation and pervaporation have better selectivity and/or flow than previously known membranes.

In the inventive manufacturing process the polymers to be used are pre-crosslinked in solution. This pre-cross-linking is carried out to a defined degree which is favorable for the formation of a film whereby monitoring of the pre-cross-linking preferably is carried out by gel chromatography. The polymers used are especially such polymers that are suitable for cross-linking.

From the solutions resulting from the pre-cross-linking step thin film composite membranes can be manufactured on microporous supports. For this purpose, the used polymers after application onto the microporous support are crosslinked until they are insoluble. The pre-cross-linking as well as the cross-linking to the state of insolubility are preferably carried out by heat treatment.

Thin polymer films of 0.5 to 10 μm can be manufactured from the aforementioned polymers best by applying the polymers by dip coating or submerging techniques onto the microporous supports. These are the preferred application methods. The solution has generally a concentration of 0.1 to 10%.

When the microporous support has been pretreated by applying a thin film of silicone, the thickness of the polymer film can be especially well adjusted. Since one component of the graft copolymers is a silicone rubber, an especially good adhesion is insured. This has corresponding advantages for the mechanical stability of the inventive membranes.

In their application membrane separating methods are complex processes and their effectiveness depends on various parameters.

An important parameter is the membrane to be used which effects the actual separation. It is thus advantageous to supply different membranes of a technically useful site in order to be able to optimize different separation problems with membrane separation methods.

The vapor/gas selectivity of the inventive membranes for various vapors such as methanol, MTBE, n-hexane, 1,1,1-trichlorethane or 1,1,2-trichlorfluoroethane is about a factor of up to five better as compared to the standard membrane PDMS. The flow rates, on the other hand, are within the same magnitude.

For pervaporation the inventive membranes show a better enrichment of organic components than the standard membrane material PDMS for a comparable water flow rate.

When the flow rate through the entire membrane (=separating layer plus support) is within the magnitude of approximately 10% of the possible flow through the support, this will result in a reduction of the membrane selectivity. The instant membranes can be adjusted in their thickness, i.e., in their flow rate; thus, it is possible to insure the optimal separation efficiency on any support. This is in contrast to PDMS where the thickness that can be adjusted without problems is limited to a range of 0.5 to approximately 10 μm.

DESCRIPTION OF PREFERRED EMBODIMENTS

The present invention will now be described in detail with the aid of several specific embodiments representation the following examples.

EXAMPLES

In the Examples 1 and 2 the manufacture and analysis of pre-crosslinked polymer solutions is described.

Example 3 describes the coating of microporous supports made of PEI and PVDF with solutions according to examples I and II.

Example 4 gives the results of pervaporation of n-butanol/water mixtures in comparison to PDMS (prior art).

Example 5 describes the manufacture of films of a defined thickness from a solution according to Example 1 and the resulting gas flows of a PDMS layer of 1 μm thickness supported on a support.

Examples 6 to 8 describe the manufacture of silicone graft copolymers with a medium polar character (Example 6; A4), polar character (Example 7; C4), and non-polar character (Example 8; P4) as pre-crosslinked ready-to-use solutions.

Example 9 describe the permeability of different aforementioned polymers for clean gases and different vapors.

Example 10 describes the flow rates and selectivities in real mixtures of methanol/argon at different methanol partial pressures.

Example 1

Membrane GI

To 60 g (35 to 40%) methyloctyl (3 to 4%) vinylmethyl (56 to 64%), dimethylsiloxane terpolymer were added 6 g (30 to 40%) methylhydro (60 to 75%) dimethylsiloxane copolymer and dissolved in 600 ml of i-octane. 0.6 ml of a 3% solution of platinum divinyltetramethyldisiloxane complex in xylene were added and the solution was stirred for 20 minutes at 100° C.

The resulting solution was very well suited for manufacturing micropore-free films on porous supports and was found to be essentially unchanged after several weeks.

The cross-linking reaction was monitored by gel chromatography with the aid of an RI/viscometer double detector whereby the polydispersity and the intrinsic viscosity were measured on-line in tetrahydrofurane. At the beginning of the reaction the polydispersity ($M_w/M_n$) was detected to be 3.1 and the intrinsic viscosity (IV) was detected to be 0.13 dl/g. After twenty minutes $M_w/M_n$ was 17.3 and IV 0.30 dl/g.

Example 2

To 100 g (35 to 40%) methyloctyl (3 to 4%) vinylmethyl (56 to 64%) dimethylsiloxane terpolymer dissolved in 1,000 ml of i-octane was added 10 g (25 to 30%) methylhydro (70 to 75%) methyloctylsiloxane copolymer. One ml of 3% of platinum divinyltetramethyldisiloxane complex dissolved in xylene were added and the solutions stirred for 20 minutes at 100° C.

The resulting solution was well suited for manufacturing micropor-free films on porous supports and was found to be unchanged after several weeks.

As in Example 1 the polydispersity and the intrinsic viscosity were measured. $M_w/M_n$ was at the beginning 3.0; after 20 minutes at 100° $M_w/M_n$ was 76. IV was at the beginning 0.10 dl/g and at the end of the pre-cross-linking was determined to be 0.24 dl/g.

Example 3

Manufacture of thin film composite membranes from solutions according to Examples 1 and 2.

For coating microporous polyetherimide supports on fleece (=PEI; Q approximately 300 $m^3/m^2 \cdot h \cdot bar$) and microporous polyvinylidenefluoride supports on fleece (=PVDF; Q approximately 90 $m^3/m^2 \cdot h \cdot bar$). Coating was carried out by hand or with a coating machine by dip coating with 2%, 3%, 5% or 10% solutions and vulcanization was carried out at 80° to 100° C. for 3 to 10 minutes. The resulting films were clear, colorless, and cross-linked to the state of insolubility.

In order to obtain thicker films with the coating machine the thickness of the active membrane could be almost doubled by a renewed coating of a coated and vulcanized support (see Example 8 to 9).

Test pieces were taken in order to measure the gas flows of nitrogen and oxygen. Thus, is it possible to measure the effective membrane thickness and to check whether defects (pin holes) are present in the membrane. At an $O_2/N_2$ selectivity of 2.1 to 2.3, determined by $pO_2/pN_2$, the membrane is free of pin holes.

The thickness of the thickest membrane was determined with an electron scan microscope. The relation of measured thickness/gas flow (p $N_2$) was the basis for calculating other membrane thickness.

a) Membranes of solutions according to Example 1 (No. 1–11):

| | Manufacturing Method | | $PN_2$[1] | $pO_2$[1] | $pO_2/pN_2$ | Membrane Thickness |
|---|---|---|---|---|---|---|
| 1 | autom., roller | 10% | 0.15 | 0.34 | 2.27 | 3.0 |
| 2 | autom., dip-c. | 5% | 0.14 | 0.30 | 2.14 | 3.2 |
| 3 | autom., dip-c. | 10% | 0.057 | 0.13 | 2.28 | 7.0 |
| | manual, sponge | 10% | 0.028 | 0.063 | 2.25 | 16 (× times) |
| 4a | manual, sponge | 10% | 0.016 | 0.036 | 2.25 | 28 (× times) |
| 4b | manual, sponge | 10% | 0.0093 | 0.021 | 2.23 | 50 (× times) |
| 5 | manual, sponge | 2% | 0.21 | 0.43 | 2.05 | 2.2 (4×) |
| 6 | autom., dip-c. | 10% | 0.044 | 0.096 | 2.18 | 10 |
| 7 | autom., dip-c. | 10% | 0.080 | 0.18 | 2.25 | 5.6 PVDF |
| 8 | autom., dip-c. | 10% | 0.054 | 0.11 | 2.05 | 7.5 (1×) |
| 9 | autom., dip-c. | 10% | 0.034 | 0.081 | 2.32 | 13 (2×) |
| 10 | autom., dip-c. | 3% | 0.25 | 0.52 | 2.08 | 1.8 PVDF |
| 11 | autom., dip-c. | 5% | 0.22 | 0.47 | 2.14 | 2.0 PVDF |
| b) Membranes from solutions according to Example 2 (No. 12–13): | | | | | | |
| 12 | autom., dip-c. | 10% | 0.047 | 0.105 | 2.25 | 9.6 |
| 13 | autom., dip-c. | 10% | 0.065 | 0.146 | 2.25 | 6.9 PVDF |

All examples, if not noted otherwise, on polyetherimide supports.
[1] in $m^3 \ N/m^2 \cdot h \cdot bar$
[2] in um Example 4

For pervaporation experiments of 1 weight% n-butanol/water at 50° C. membranes according to Example 3 were produced from solutions according to Example 1 on PEI supports. Furthermore, composite membranes of Examples 6, 7, and 8 were tested for this purpose.

Membranes according to Example 3

| Membrane Thickness (μm) | Feed-Conz. Weight % | Perm. Conz. Weight % | Total Flow Rate | BuOH | Water | β | α | Flow BuOH/$H_2O$ |
|---|---|---|---|---|---|---|---|---|
| 2.2 | 1.0 | 19.4 | 1800 | 350 | 1450 | 19 | 24 | 0.24 |
| 7.9 | 1.0 | 20.0 | 665 | 133 | 532 | 20 | 26 | 0.25 |
| 16 | 1.0 | 40.4 | 275 | 111 | 164 | 40 | 67 | 0.68 |
| 28 | 1.0 | 44.0 | 237 | 105 | 132 | 44 | 78 | 0.80 |
| 50 | 1.0 | 48.0 | 123 | 61.5 | 61.5 | 48 | 91 | 1.0 |
| 7.9 | 1.23 | 26.7 | 687 | 183 | 504 | 22 | 29 | 0.36(50° C.) |
| 7.9 | 1.25 | 24.9 | 339 | 84 | 255 | 20 | 26 | 0.33(37° C.) |
| 7.9) | 1.0 | 22 | 687 | 151 | 536 | 22 | 28 | 0.28(50° C.) |
| 7.9) | 1.0 | 20 | 339 | 68 | 271 | 20 | 25 | 0.25(37° C.) |

-continued

| Membrane Thickness (μm) | Feed-Conz. Weight % | Perm. Conz. Weight % | Total Flow Rate | BuOH | Water | β | α | Flow BuOH/H$_2$O |
|---|---|---|---|---|---|---|---|---|
| PDMS as a comparison | | | | | | | | |
| 4.5 | 1.0 | 14 | 1900 | −266 | 1634 | 14 | 16 | 0.16 |
| 11 | 1.0 | 20 | 1000 | 200 | 800 | 20 | 25 | 0.25 |
| PDMS (as a comparison; literature results) | | | | | | | | |
| 180 | 1.0 | 42.5 | 87 | 37 | 50 | 43 | 72 | 0.74(30° C.) |
| 400 | 1.0 | 37 | 12.6 | 4.4 | 8.2 | 37 | 56 | 0.54(37° C.) |

1) = values of 1.23% BuOH in feed calculated to 1.0%!

Membranes according to examples 6, 7 and 8

| Membrane Thickness (μm) | Feed-Conz. Weight % | Perm. Conz. Weight % | Total Flow Rate | BuOH | Water | β | α | Flow BuOH/H$_2$O |
|---|---|---|---|---|---|---|---|---|
| C4 (4 μm) | 1.08 | 25.7 | 1130 | 290 | 840 | 23 | 32 | 0.34 |
| | 1.02 | 19.3 | 1080 | 210 | 870 | 19 | 23 | 0.24 |
| | 0.95 | 17.6 | 1040 | 180 | 860 | 19 | 22 | 0.21 |
| | 0.91 | 17.6 | 1030 | 180 | 850 | 19 | 23 | 0.21 |
| | 0.88 | 16.3 | 1030 | 170 | 860 | 19 | 22 | 0.20 |
| P4 (15 μm) | 0.975 | 35.0 | 252 | 88.2 | 163.8 | 36 | 55 | 0.54 |
| | 0.95 | 36.1 | 244 | 88.1 | 155.9 | 38 | 59 | 0.57 |
| | 0.95 | 35.2 | 244 | 85.9 | 158.1 | 37 | 57 | 0.54 |
| A4 (11 μm) | 0.95 | 28.6 | 482 | 138 | 344 | 30 | 42 | 0.40 |
| | 0.95 | 26.9 | 502 | 135 | 367 | 28 | 38 | 0.37 |
| | 0.915 | 25.6 | 473 | 121 | 352 | 28 | 37 | 0.34 |
| | 0.88 | 24.7 | 452 | 112 | 340 | 28 | 37 | 0.33 |

Example 5

Manufacture of thin film composite membranes with stepped, defined gas flow rate over one magnitude for vapors.

A solution manufactured according to Example 1 was diluted to 0.5%, 2.5%, and 5% and applied by dip coating onto a microporous PEI support onto which a layer of 1 μm of PDMS had been applied previously and by cross-linking as described in Example 3 under heat treatment. The O$_2$ and N$_2$ flow rates were measured in order to determine the effective layer thickness and the absence of defects.

With a measuring apparatus for permeability measurements for vapors at decreasing feed pressures the membrane flow rate in the area of approximately 100 mbar were at 20° C. was measured and evaluated with an e function for the 0.0 mbar of feed pressure. The apparent permeability value for vapors at 0 mbar feed pressure divided by the permeability of N$_2$ provides a very good approximation of the selectivity of real vapor/gas mixtures. These values were compared with a 1 μm standard PDMS membrane and show higher selectivity and for a thinner membrane sufficiently great flow rates. The measured values are compiled in the following table.

Table Hydrocarbon Permeability
The measuring temperature was 20° C.

| Membrane type | 1) (μm) | pN$_2$ | pC$_2$ | pC$_4$ | pC$_6$ |
|---|---|---|---|---|---|
| PEI/—/GI 10% | 10 | 0.0435 | 0.44 | 1.8 | 7.2 |
| PEI/1 μm PDMS/GI 5.0% | 4.7 | 0.0944 | 0.92 | 4.1 | 13 |
| PEI/1 μm PDMS/GI 2.5% | 2.3 | 0.192 | 1.9 | 7.7 | 25 |
| PEI/1 μm PDMS/GI 0.5% | 0.7 | 0.324 | 3.1 | 12 | 36 |

-continued

Table Hydrocarbon Permeability
The measuring temperature was 20° C.

| | | 0.81 | 7.0 | 22 | — |
|---|---|---|---|---|---|
| Membrane type | | pO$_2$/pN$_2$ | pC$_2$/pN$_2$ | pC$_4$/pN$_2$ | pC$_6$/pN$_2$ |
| PEI/—/GI 10% | | 2.3 | 10 | 41 | 166 |
| PEI/1 μm PDMS/GI 5.0% | | 2.2 | 9.7 | 44 | 137 |
| PEI/1 μm PDMS/GI 2.5% | | 2.2 | 9.7 | 40 | 129 |
| PEI/1 μm PDMS/GI 0.5% | | 2.2 | 9.6 | 38 | 110 |
| PEI/1 μm PDMS/GI — | | 2.2 | 8.7 | 27 | — |

1) effective membrane thickness of the cover layer; calculated from gas flow rates.
Flows (p) in $m_N^3/m^2 \cdot h \cdot bar$:
C$_2$ = ethane:
C$_4$ = n-butane:
C$_6$ = n-hexane Example 6

Membrane A4

7.0 grams of Poly (N-undecenoyl maleicimide-alt-octadecylvinylether) were dissolved in 150 ml of i-octane and 7.0 g of (35 to 40%) methyloctyl (3 to 4%) vinylmethyl (56 to 64%) dimethylsiloxane terpolymer were added as well as 1.4 grams ( 30 to 40%) methylhydro (60 to 75%) dimethylsiloxane copolymer. 150 μl of a 3% platinum divinyltetramethyldisiloxane catalyst were added and the solutions stirred at 70° C. for 15 minutes.

The resulting solution was very well suitable for manufacturing micropore-free films on porous supports and after several weeks remained essentially unchanged.

As described in Example 1 the cross-linking reaction was monitored by gel chromotography and an increase of the polydispersity $M_w/M_n$ of 16 before the reaction to more than 100 after 15 minutes was determined. From this solution a membrane of 504 µm thickness was prepared and the gas flow rates were determined. The membrane was a little opaque and colorless. Composite membranes were prepared with a membrane pulling machine by dip coating from polymer solutions prepared by the same method. The gas separation values are compiled in Example 9. The pervaporation of n-butanol/water is described in Example 4.

Example 7

Membrane C4

11.0 g of poly(N-undecenoylmaleicimide-alt-vinyl-2-(2-ethoxyethoxy) ethylether) were dissolved in 230 ml of carbon tetrachloride and 11.0 g of (35 to 40%) methyloctyl (3 to 4%) vinylmethyl (56 to 64%) dimethylsiloxane terpolymer and 1.1 g of (30 to 40%) methylhydro (60 to 75%) dimethylsiloxane copolymer were added. 230 µl of a 3% solution of platinum divinyltetramethlydisiloxane catalyst were added and the solution stirred for 15 minutes at 50° C.

The resulting solution was well suited for manufacturing micropore-free films on porous supports and after several weeks remained essentially unchanged.

As in Example 1 the cross-linking reaction was monitored by gel chromotography and an increase in polydispersity $M_w/M_n$ from 13 before the reaction to more than 100 after 15 minutes was found.

From this solution a membrane of 120 µm thickness was manufactured and the gas flow rates were measured. The membrane was a little opaque and colorless.

From a polymer solution manufactured by the same method a composite membrane of a few square meters was manufactured with a membrane pulling machine by dip coating.

The flow rates are represented in Examples 9 and 10.

The pervaporation of n-butanols/water is described in Example 4.

Example 8

Membrane P4

5.0 g of Vestenamar 6213 were dissolved in 120 ml of cyclohexane/carbon tetrachloride (100/20 volume/volume) and 5.0 grams of (35 to 40%) methyloctyl (3 to 4%) vinylmethyl (56 to 64%) dimethylsiloxane terpolymer and 0.5 grams of (30 to 40%) methylhydro (60 to 75%) dimethylsiloxane copolymer were added. To the clear solution 50 µl of a 3% solution of platinum divinyltetramethyldisiloxane catalyst were added at 70° C. and the resulting solution was stirred at 70° C. for 35 minutes.

The resulting solution was well suitable for manufacturing micropore-free films on porous supports and after several weeks remained essentially unchanged.

As in Example 1 the cross-linking reaction was monitored by gel chromotography and an increase of polydispersity $M_w/M_n$ of 5.3 before the reaction to 6.7 after 35 minutes was found.

From this solution a membrane of 225 µm thickness was manufactured and gas flow rates were measured. The membrane was milky and turbid, colorless, and very elastic.

From polymer solutions manufactured by the same method composite membranes of approximately 10 m² were manufactured with a membrane pulling machine by dip coating.

The gas separation values are represented in Example 9.

The pervaporation of n-butanol/water is disclosed in Example 4.

Example 9

In Example 9 the permeabilities and gas separation values for membrane test pieces and composite membranes are compiled. The composite membranes were prepared on a membrane pulling machine in a size of several square meters.

All values were measured at 30° C. and recalculated for normal conditions.

a) Membrane test pieces

Flow rates:

| Membrane | $pN_2$ | $pO_2$ | $pCH_4$ | $pCO_2$ |
| --- | --- | --- | --- | --- |
| A4 | 19.2 | 44.9 | 59.6 | 225 |
| C4 | 5.1 | 12.3 | 17.5 | 83.9 |
| GI/10% A4 | 43 | 95 | 134 | 429 |
| GI/40% A4 | 17 | 38 | 55 | 186 |
| P4 | 14 | 34 | 49 | 177 |
| as a comparison PDMS | 73 | 154 | 227 | 780 |

Flow rates (p) in $m^3 N \cdot m/m^2 \cdot h \cdot bar \times 10^{-8}$

Selectivities:

| Membrane | $pO_2/pN_2$ | $pCH_4/pN_2$ | $PCO_2/pN_2$ |
| --- | --- | --- | --- |
| A4 | 2.3 | 3.1 | 12 |
| C4 | 2.4 | 3.5 | 17 |
| GI/10% A4 | 2.2 | 3.1 | 10 |
| GI/40% A4 | 2.2 | 3.0 | 11 |
| P4 | 2.4 | 3.5 | 13 |
| as a comparison PDMS | 2.2 | 3.1 | 10 | b) Composite membranes on microporous polyethermide supports (PEI).

Test for pin holes

| Membrane | $pN_2$ | $pO_2$ | $pCO_2$ | $pO_2/pN_2$ | $pCO_2/pN_2$ |
| --- | --- | --- | --- | --- | --- |
| A4 (10%) | 0.018 | 0.045 | 0.25 | 2.5 | 14 |
| A4 (5%) | 0.023 | 0.058 | 0.34 | 2.6 | 15 |
| C4 (3%) | 0.048 | 0.116 | 0.75 | 2.4 | 16 |
| C4 (2 × 3%) | 0.023 | 0.063 | 0.47 | 2.7 | 20 |
| C4 (10%) | 0.012 | 0.029 | — | 2.5 | — |
| P4 (10%) | 0.00079 | 0.020 | — | 2.5 | — |

Flow rates (p) in $m^2 N/m^3 \cdot h \cdot bar$

The values of vapor/gas permeability were measured in a measuring apparatus according to the pressure increase method with pure vapors at decreasing feed pressures. The following vapors: methanol (MeOH), methyl-t-butylether (MTBE), 1,1,1-tricholoroethane ($Cl_3Eth$), and 1,1,2-trichlorfluorethane ($Cl_3F_3Eth$) and the gases:

nitrogen ($N_2$), oxygen ($O_2$), chloromethane ($CH_3Cl$), and chloroethane ($CH_3CH_2Cl$) were measured.

Membrane flow rates of vapors:

| Membrane | $pCl_3Eth$ | pMeOH | pMTBE | $pCl_3F_3Eth$ | $pO_2$ |
| --- | --- | --- | --- | --- | --- |
| A4 (10%) | 1.71 | 0.99 | 0.96 | 0.48 | 0.030 |
| C4 (10%) | 1.29 | 1.84 | 0.54 | 0.23 | 0.025 |
| GI (10%) | 4.49 | 1.31 | 3.05 | 1.76 | 0.070 |
| P4 (10%) | 1.23 | 0.33 | 0.71 | 0.30 | 0.018 |
| PDMS 1 µm | 35.1 | 34.6 | 28.7 | 19.3 | 2.13 |

-continued

| Membrane | pCl₃Eth | pMeOH | pMTBE | pCl₃F₃Eth | pO₂ |
|---|---|---|---|---|---|
| AI/1 μm PDMS | 11.6 | 10.4 | 7.7 | 3.8 | 0.24 |
| CI/1 μm PDMS | 4.6 | 13.3 | 1.8 | 0.70 | 0.094 |

Flow rate (p) in $m^3N/m^2.h.bar$;
AI = poly(N-undecenoylmaleic imide-alt-octa-decylvinylether);
CI = poly(N-undecenoylmaleic imide-alt-vinyl-2-(2-ethoxyethoxy)ethyl-ether):

Membranes selectivity of the vapors:

| Membrane | pCl₃Eth/ pN₂ | pMeOH/ pN₂ | pMTBE/ pN₂ | PCl₃F₃Eth/ pN₂ | pO₂/ pN₂ |
|---|---|---|---|---|---|
| A4 (10%) | 150 | 86 | 83 | 41 | 2.56 |
| C4 (10%) | 130 | 190 | 55 | 24 | 2.55 |
| GI (10%) | 140 | 42 | 98 | 57 | 2.26 |
| P4 (10%) | 190 | 50 | 110 | 46 | 2.68 |
| PDMS 1 μm | 35 | 35 | 29 | 19 | 2.13 |
| AI/1 μm PDMS | 120 | 110 | 79 | 39 | 2.44 |
| CI/1 μm PDMS | 110 | 320 | 42 | 17 | 2.22 |

AI = Poly(n-undecenoylmaleic imide-alt-octadecylvinylether);
CI = poly(N-undecenoylmaleic imide-alt-vinyl-2-(2-ethoxy ethoxy)ethyl-ether);

Membrane flow rates of the gases:

| Membrane | pN₂ | pO₂ | pCH₃Cl | pCH₃CH₂Cl |
|---|---|---|---|---|
| A4 (10%) | 0.0113 | 0.0286 | 0.0818 | 0.0509 |
| C4 (10%) | 0.0123 | 0.0325 | 0.168 | 0.0148 |
| GI (10%) | 0.0405 | 0.0951 | 0.455 | 0.0532 |
| P4 (10%) | 0.00727 | 0.0191 | 0.0878 | 0.00634 |
| PDMS 1 μm | 0.0674 | 0.161 | 1.74 | 0.363 |
| AI/1 μm PDMS | | | | |

Flow rates (p) in $m^3N/m^2.h.bar$;
AI = poly(N-undecenoylmaleic imide-alt-octa-decylvinylether);
CI = poly(N-undecenoylmaleic imide-alt-vinyl-2-(2-ethoxyethoxy) ethyl-ether):

Membrane selectivity of the gases.

| Membrane | pO₂/ pN₂ | pCH₃Cl/ pN₂ | pCH₃CH₂Cl/ pN₂ |
|---|---|---|---|
| A4 (10%) | 2.53 | 7.2 | 4.5 |
| C4 (10%) | 2.63 | 14 | 1.2 |
| GI (10%) | 2.33 | 12 | 1.5 |
| P4 (10%) | 2.62 | 12 | 0.87 |
| PDMS 1 μm | 2.2 | 12 | 1.3 |
| AI/1 μm PDMS | 2.4 | 27 | 6.1 |

AI = poly (N-undecenoylmaleic imide-alt-octadecylvinylether)

Example 10

With a measuring apparatus according to the pressure increase method the gas permeability for the mixture methanol/argon at different methanol partial pressures was measured. The feed and the permeate concentration was measured on-line with a mass spectrometer. From these measurements the selectivity and the permeate concentration were calculated. Measurements were carried out at 30° C. and a small step cut was taken (feed concentration ≈ permeate concentration).

Real Vapor Separation Methanol/Argon:

| Membrane | Feed Vol % | Perm. Vol % | alpha | total flow p | MeOH-flow p | Ar- flow p |
|---|---|---|---|---|---|---|
| GI | — | — | — | 0.0794 | — | 0.0794 |
| | 0.441 | 9.4 | 24 | 0.0878 | 0.0083 | 0.0795 |
| | 0.996 | 19.3 | 24 | 0.0905 | 0.0175 | 0.0730 |
| | 2.02 | 33.9 | 25 | 0.103 | 0.0349 | 0.0681 |
| | 3.86 | 48.8 | 24 | 0.123 | 0.0600 | 0.0630 |
| | 7.01 | 62.8 | 23 | 0.154 | 0.0967 | 0.0573 |
| | 12.1 | 77.3 | 25 | 0.219 | 0.169 | 0.0497 |
| | 15.7 | 82.4 | 25 | 0.249 | 0.205 | 0.0439 |
| C4 | — | — | — | 0.0239 | — | 0.0239 |
| | 0.441 | 26.0 | 84 | 0.0345 | 0.0090 | 0.0255 |
| | 0.996 | 44.5 | 83 | 0.0373 | 0.0166 | 0.0207 |
| | 2.02 | 61.9 | 81 | 0.0372 | 0.0230 | 0.0142 |
| | 3.86 | 78.8 | 94 | 0.0373 | 0.0294 | 0.0079 |
| | 7.01 | 89.2 | 110 | 0.118 | 0.105 | 0.0127 |
| | 12.1 | 93.9 | 110 | 0.192 | 0.180 | 0.0117 |
| | 15.7 | 95.6 | 120 | 0.261 | 0.250 | 0.0110 | flow (p) in $m_N^3/m^2.h.bar$

BRIEF DESCRIPTION OF THE DRAWING

From the only FIGURE a comparison of the effectiveness of membranes of different separating factors can be taken.

The values for the feed and the permeate concentrations are plotted in the form of a diagram together with the values for hypothetical membranes with separating factors of alpha=10 and 310. A comparison of their curves shows that the more selective membranes have an advantage relative to membranes with separating factors smaller than 25.

Figure 1:
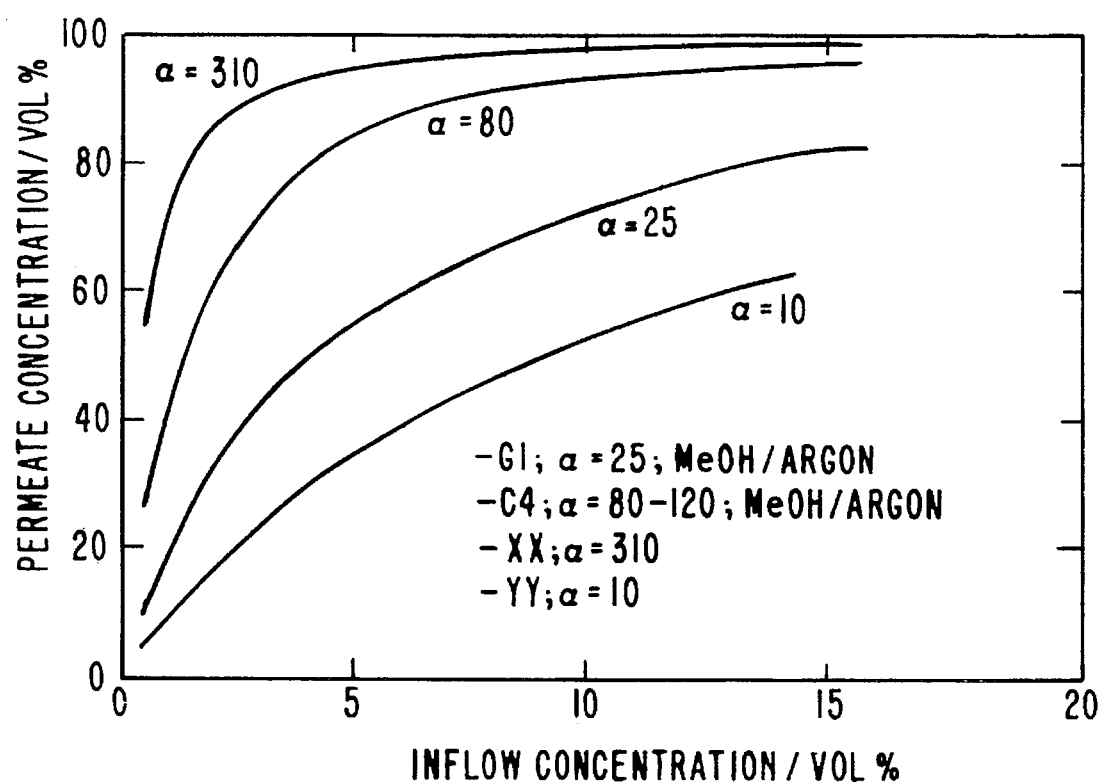

Especially within a feed concentration range about 5 vol.-% the differences become very apparent and even a membrane with alpha=25 falls far behind the more selective membranes.

The selectivity of a standard PDMS membrane is within the range of approximately alpha=25.

The present invention is, of course, in no way restricted to the specific disclosure of the specification and drawings, but also encompasses any modifications within the scope of the appended claims.

What we claim is:

1. A membrane comprised of a graft copolymer comprising a base component and a copolymer component, said base component comprising a first polymer having a repeating unit of the following general formula:

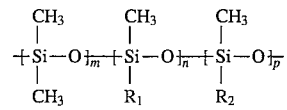

wherein m=0.1–0.9, n=0.9–0.1, p=0.03–0.04, $R_1$ can be a linear, branched or cyclic $C_1$–$C_{12}$ non-aromatic hydrocarbon radical, $R_2$ can be a linear, branched or cyclic $C_1$–$C_{12}$ non-aromatic hydrocarbon radical, and wherein at least one of said $R_1$ and $R_2$ is a linear or branched non-aromatic hydrocarbon radical with a terminal C=C double bond, said copolymer component comprising a siloxane copolymer having reactive sites for undergoing hydrosilylation.

2. A membrane according to claim 1, wherein said base component comprises a second polymer having a carbon chain and containing C=C double bonds.

3. A membrane according to claim 2, wherein said C=C double bonds are located in the main chain and/or a side chain of said second polymer.

4. A membrane according to claim 2, wherein said second polymer has a repeating unit of the following general formula:

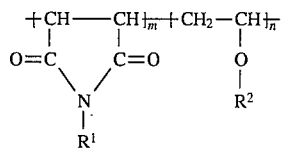

wherein m=n, wherein $R^1$ and $R^2$ are identical or different, and wherein 10 to 100% of $R^1$ and/or $R^2$ have a C=C double bond.

5. A membrane according to claim 4, wherein said C=C double bond of $R^1$ and $R^2$ is a terminal C=C double bond.

6. A membrane according to claim 2, wherein said second polymer is made from cyclic olefins by metathesis.

7. A membrane according to claim 2, further comprising a support, wherein said first polymer and said second polymer are incompletely cross-linked in solution with said copolymer component, the resulting solution is applied to said support, and cross-linked to the state of insolubility via double bonds present at the graft copolymer.

8. A membrane according to claim 7, wherein said support is comprised of a polymer of very high gas permeability and has a thickness of 0.1 to 1.0 μm.

9. A membrane according to claim 8, wherein said polymer of very-high gas permeability is selected from the group consisting of polydimethylsiloxane and polytrimethylsilylpropine.

10. A membrane according to claim 2, wherein said siloxane copolymer has a low molecular weight.

11. A membrane according to claim 1, further comprising a support, wherein said first polymer is incompletely cross-linked in solution with said copolymer component, the resulting solution is applied to said support, and cross-linked to the state of insolubility via double bonds present at the graft copolymer.

12. A membrane according to claim 11, wherein said support is comprised of a polymer of very high gas permeability and has a thickness of 0.1 to 1.0 μm.

13. A membrane according to claim 12, wherein said polymer of very high gas permeability is selected from the group consisting of polydimethylsiloxane and polytrimethylsilylpropine.

14. A membrane according to claim 1, wherein said graft copolymer is a film of a thickness of 0.5 to 200 μm.

15. A graft copolymer comprised of a base component and a copolymer component, said base component comprising a first polymer of a repeating unit of the following general formula:

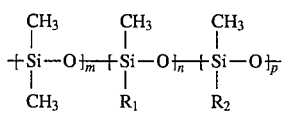

wherein m=0.1–0.9, n=0.9–0.1, p=0.03–0.04, $R_1$ can be a linear, branched or cyclic $C_1$–$C_{12}$ non-aromatic hydrocarbon radical, $R_2$ can be a linear, branched or cyclic $C_1$–$C_{12}$ non-aromatic hydrocarbon radical, and wherein at least one of said $R_1$ and $R_2$ is a linear or branched non-aromatic hydrocarbon radical with a terminal C=C double bond, said copolymer component comprising a siloxane copolymer having reactive sites for undergoing hydrosilylation.

16. A graft copolymer according to claim 15, wherein said base component comprises a second polymer having a carbon chain and containing C=C double bonds, wherein said C=C double bonds are located in the main chain of said second polymer and/or in a side chain of said second polymer.

17. A graft copolymer according to claim 16, wherein said second polymer has a repeating unit of the following general formula

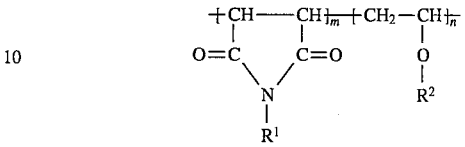

wherein m=n, wherein $R^1$ and $R^2$ are identical or different, and wherein 10 to 100% of $R^1$ and/or $R^2$ have a C=C double bond.

18. A graft copolymer according to claim 16 dissolved in a solvent.

19. A graft copolymer according to claim 16 at least partially cross-linked.

20. A graft copolymer according to claim 19 cross-linked to a state of insolubility.

21. A graft copolymer according to claim 16 wherein said siloxane copolymer has a low molecular weight.

22. A graft copolymer according to claim 15 dissolved in a solvent.

23. A graft copolymer according to claim 15 at least partially cross-linked.

24. A graft copolymer according to claim 15 cross-linked to a state of insolubility.

25. A graft copolymer according to claim 15 wherein said siloxane copolymer has a low molecular weight.

26. A method of manufacturing a membrane, said method comprising, the steps of:

providing a base component comprising a first polymer of a repeating unit of the following general formula:

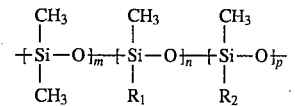

wherein m=0.1–0.9, n=0.9–0.1, p=0.03–0.04, $R_1$ can be a linear, branched or cyclic $C_1$–$C_{12}$ non-aromatic hydrocarbon radical, $R_2$ can be a linear, branched or cyclic $C_1$–$C_{12}$ non-aromatic hydrocarbon radical, and wherein at least one of said $R_1$ and $R_2$ is a linear or branched non-aromatic hydrocarbon radical with a terminal C=C double bond;

dissolving said first polymer in a solvent to form a polymer solution;

adding a copolymer component to the polymer solution, the copolymer component comprising a siloxane copolymer having reactive sites for undergoing hydrosilylation;

adding a cross-linking catalyst to the polymer solution;

partly cross-linking the first polymer with the copolymer component to a desired degree to form a partly cross-linked graft copolymer solution;

applying the partly cross-linked graft copolymer solution to a support; and continuing cross-linking until the graft copolymer is insoluble.

27. A method according to claim 26, wherein said step of partly cross-linking includes the step of monitoring the degree of cross-linking by gel chromatography.

28. A method according to claim 26, wherein the siloxane copolymer has a low molecular weight, wherein said step of adding a catalyst includes the step of adding a hydrosilylation catalyst.

29. A method according to claim 28, wherein said siloxane copolymer is added to the polymer solution in an amount of 5 to 10 weight-%, based on the total weight of the first polymer and the siloxane copolymer.

30. A method of manufacturing a membrane, said method comprising the steps of:

providing a first polymer of a repeating unit of the following general formula:

$$\mathrm{+Si(CH_3)_2-O\mathclose{]}_m\mathopen{[}Si(CH_3)(R_1)-O\mathclose{]}_n\mathopen{[}Si(CH_3)(R_2)-O\mathclose{]}_p}$$

wherein m=0.1–0.9, n=0.9–0.1, p=0.03–0.04, $R_1$ can be a linear, branched or cyclic $C_1$–$C_{12}$ non-aromatic hydrocarbon radical, $R_2$ can be a linear, branched or cyclic $C_1$–$C_{12}$ non-aromatic hydrocarbon radical, and wherein at least one of said $R_1$ and $R_2$ is a linear or branched non-aromatic hydrocarbon radical with a terminal C=C double bond;

providing a second polymer having a carbon chain and containing C=C double bonds;

dissolving said first polymer and said second polymer in a solvent to form a polymer solution;

adding a copolymer component to the polymer solution, the copolymer component comprising a siloxane copolymer having reactive sites for undergoing hydrosilylation;

adding a cross-linking catalyst to the polymer solution;

partly cross-linking the first polymer and the second polymer with the copolymer component to a desired degree to form a partly cross-linked graft copolymer solution;

applying the partly cross-linked graft copolymer solution to a support; and continuing cross-linking of the graft copolymer until the graft copolymer is insoluble.

31. A method according to claim 30, wherein said C=C double bonds of said second polymer are located in the main chain and/or a side chain of said second polymer.

32. A method according to claim 30, wherein said second polymer has a repeating unit of the following general formula:

$$\mathrm{+CH-CH\mathclose{]}_m\mathopen{[}CH_2-CH\mathclose{]}_n}$$
with $O=C$, $C=O$, $N-R^1$ and $O-R^2$ substituents wherein m=n, wherein $R^1$ and $R^2$ are identical or different, and wherein 10 to 100% of $R^1$ and/or $R^2$ have a C=C double bond.

33. A method according to claim 30, wherein said step of partly cross-linking includes the step of monitoring the degree of cross-linking by gel chromatography.

34. A method according to claim 30 wherein siloxane copolymer has a low molecular weight, wherein said step of adding a catalyst includes the step of adding a hydrosilylation catalyst.

35. A method according to claim 34, wherein said siloxane copolymer is added to the polymer solution in an amount of 5 to 10 weight-%, based on the total weight of the first and second polymers and the siloxane copolymer.

* * * * *